United States Patent
Yoshida

(10) Patent No.: US 11,635,169 B2
(45) Date of Patent: Apr. 25, 2023

(54) FILLING APPARATUS

(71) Applicant: TATSUNO CORPORATION, Tokyo (JP)

(72) Inventor: Yuichi Yoshida, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 0 days.

(21) Appl. No.: 17/188,832

(22) Filed: Mar. 1, 2021

(65) Prior Publication Data
US 2021/0278045 A1 Sep. 9, 2021

(30) Foreign Application Priority Data

Mar. 3, 2020 (JP) .............................. JP2020-035495

(51) Int. Cl.
*F17C 5/00* (2006.01)
*F17C 13/02* (2006.01)

(52) U.S. Cl.
CPC ............ *F17C 5/007* (2013.01); *F17C 13/025* (2013.01); *F17C 2221/012* (2013.01); *F17C 2250/032* (2013.01); *F17C 2250/043* (2013.01); *F17C 2250/0443* (2013.01); *F17C 2250/0626* (2013.01); *F17C 2265/065* (2013.01); *F17C 2270/0168* (2013.01); *F17C 2270/0184* (2013.01)

(58) Field of Classification Search
CPC .. F17C 5/007; F17C 13/025; F17C 2221/012; F17C 2250/032; F17C 2250/043; F17C 2250/0443; F17C 2250/0626; F17C 2265/065; F17C 2270/0168; F17C 2270/0184; F17C 2205/0326; F17C 2205/0364; F17C 2223/035; F17C 2223/036; F17C 2225/0123

USPC ............................................................ 141/4
See application file for complete search history.

(56) References Cited

U.S. PATENT DOCUMENTS 5,868,176 A * 2/1999 Barajas .................. F17C 13/02
141/83
9,810,374 B2 11/2017 Nagura et al.
(Continued)

FOREIGN PATENT DOCUMENTS

EP 1146277 A1 10/2001
WO 2011029546 A1 3/2011

OTHER PUBLICATIONS

European Search Report for EP21160135; dated Jul. 27, 2021.

*Primary Examiner* — Jason K Niesz
(74) *Attorney, Agent, or Firm* — Stetina Brunda Garred & Brucker

(57) ABSTRACT

A filling apparatus that does not significantly reduce a required pressure immediately after a start of hydrogen filling, and can reliably fill fuel cell vehicles and the like. The filling apparatus (100) includes a control unit (10), and the control unit (10) has a function of boosting pressure required from a hydrogen filling apparatus (100) to a rear facility (200) until initial pressure measurement is completed. The control unit (10) may have a function of determining whether or not communication filling is established, and when communication filling is established, setting a pressure higher than an internal pressure of a tank received from a vehicle side by a predetermined pressure (for example, 5 MPa) as a pressure required for the rear facility (200) at an initial stage of filling.

10 Claims, 7 Drawing Sheets

(56) References Cited

U.S. PATENT DOCUMENTS

| | | | |
|---|---|---|---|
| 10,167,999 B2 | 1/2019 | Handa | |
| 10,465,849 B2* | 11/2019 | Handa | F17C 13/084 |
| 2010/0043912 A1* | 2/2010 | Allidieres | F17C 13/12 |
| | | | 251/129.01 |
| 2013/0146176 A1* | 6/2013 | Yahashi | F17C 5/06 |
| | | | 141/83 |
| 2015/0153005 A1* | 6/2015 | Takano | F17C 5/007 |
| | | | 141/227 |
| 2018/0375536 A1* | 12/2018 | Emori | B60L 53/18 |
| 2019/0074528 A1* | 3/2019 | Mori | H01M 8/04358 |
| 2019/0093826 A1* | 3/2019 | Araki | F17C 13/025 |

\* cited by examiner

[Fig. 1]
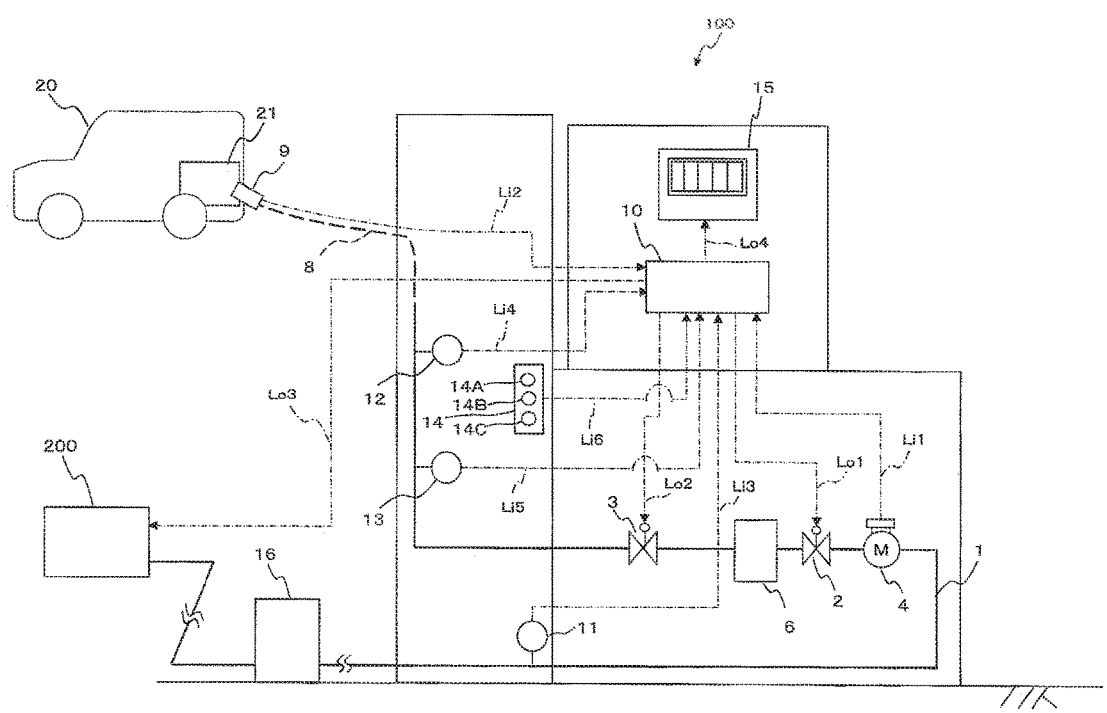

[Fig. 2]
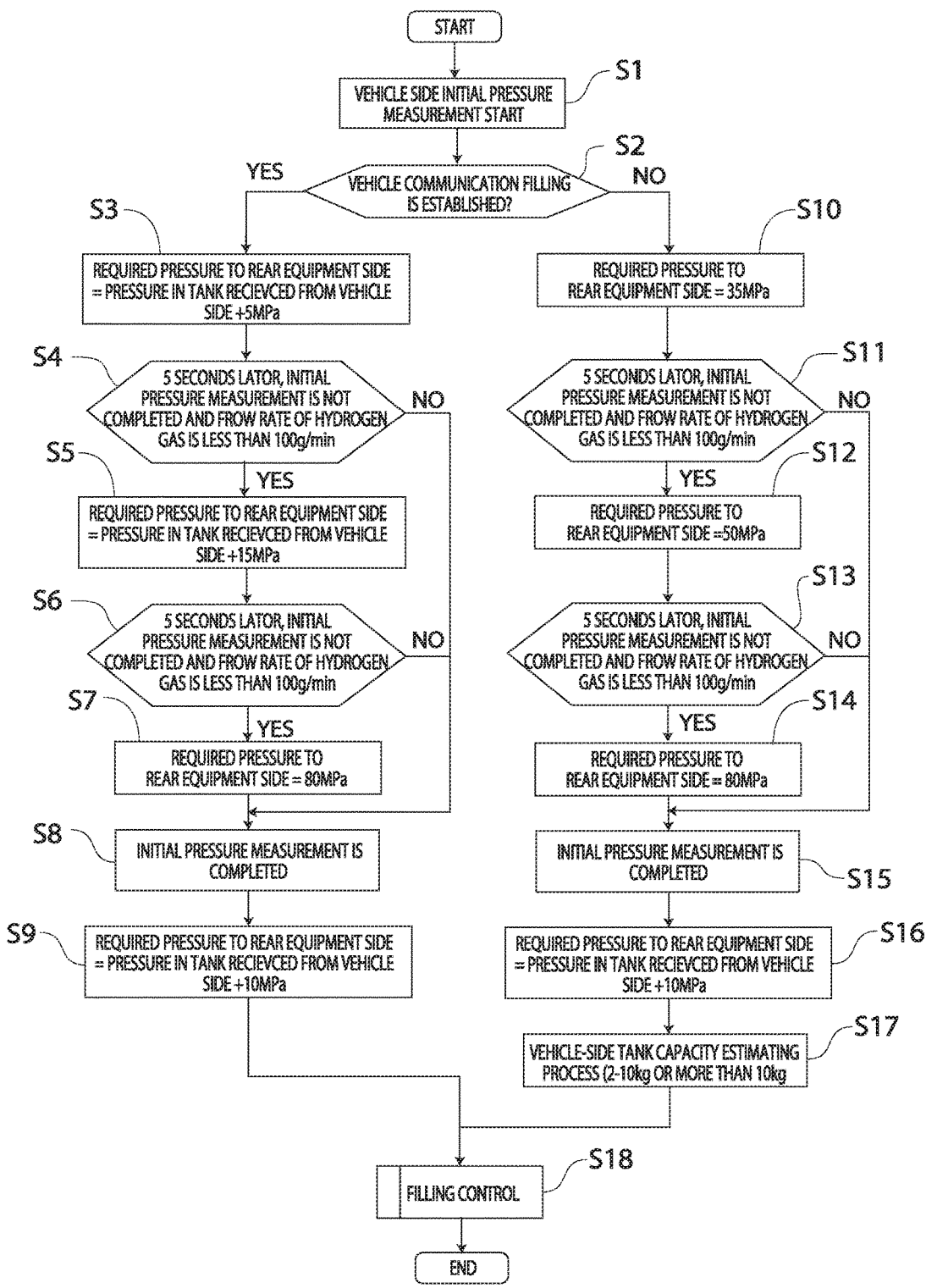

[Fig. 3]
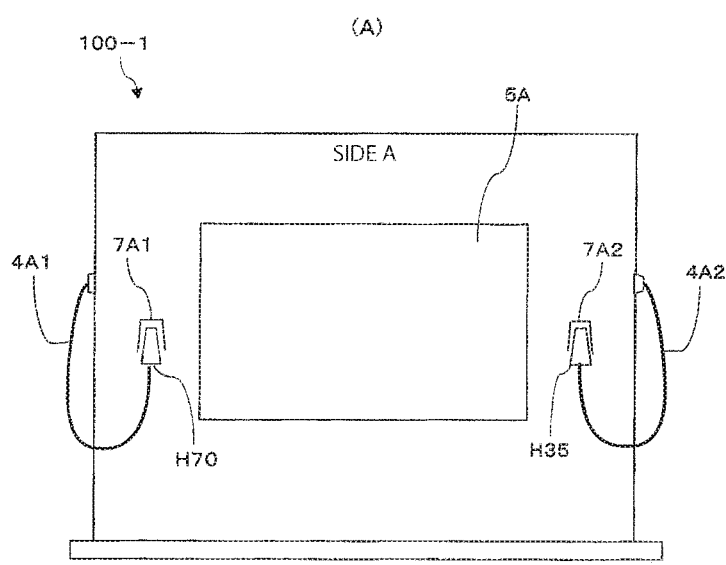
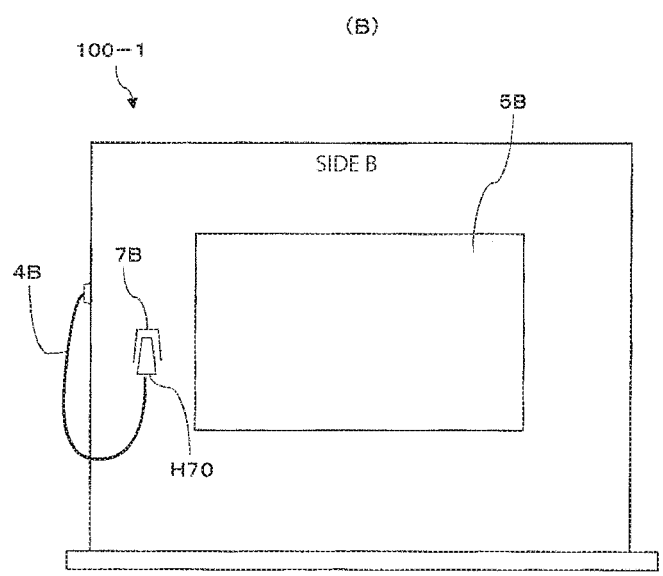

[Fig. 4]
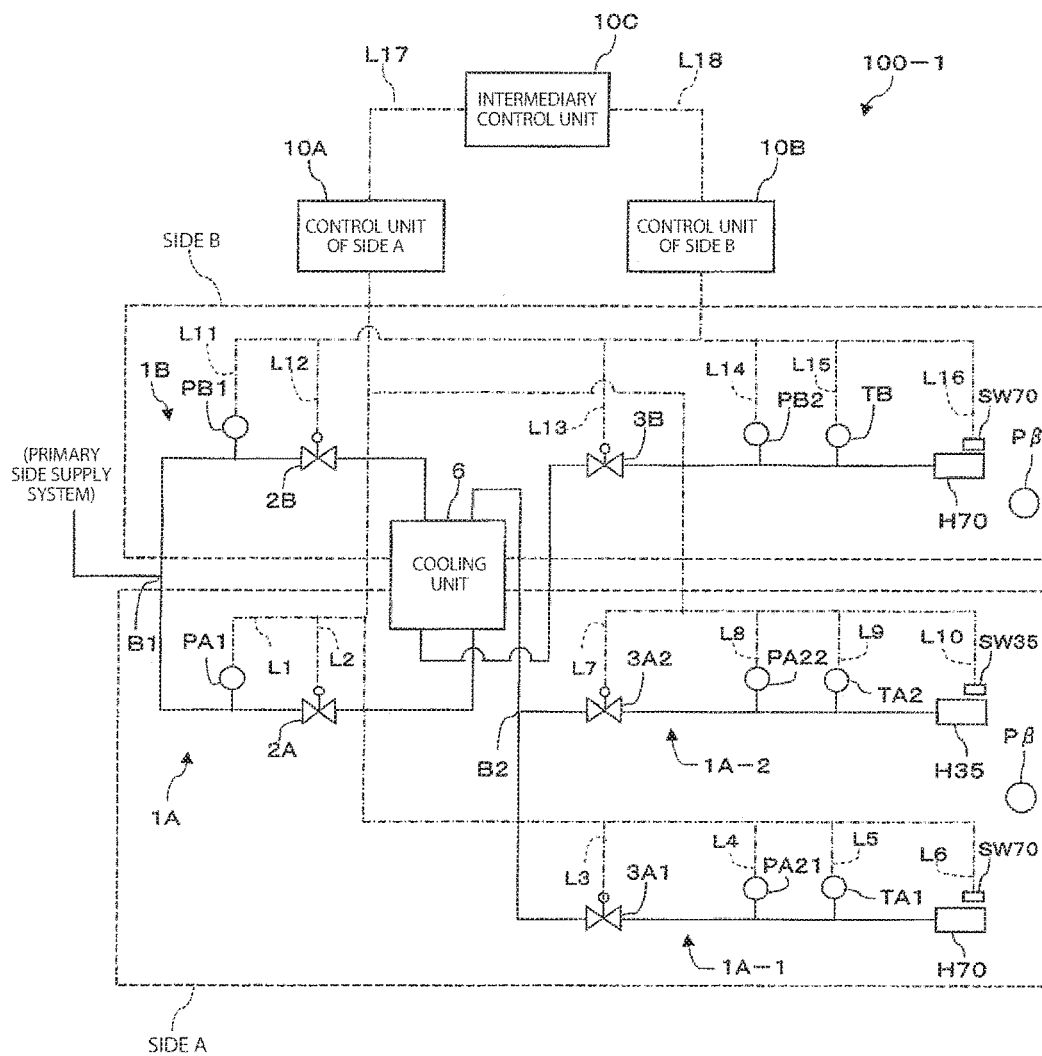

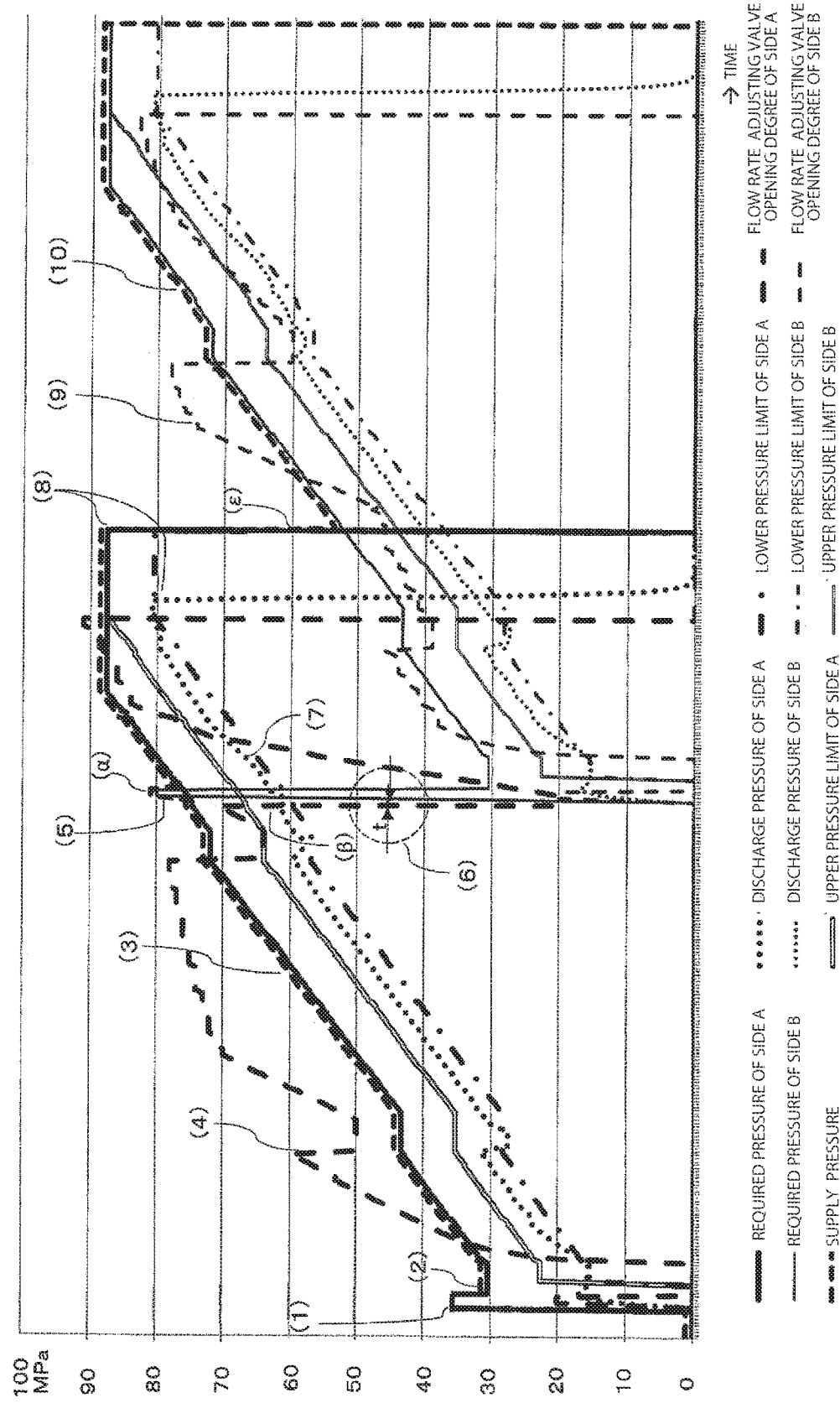
[Fig. 5]

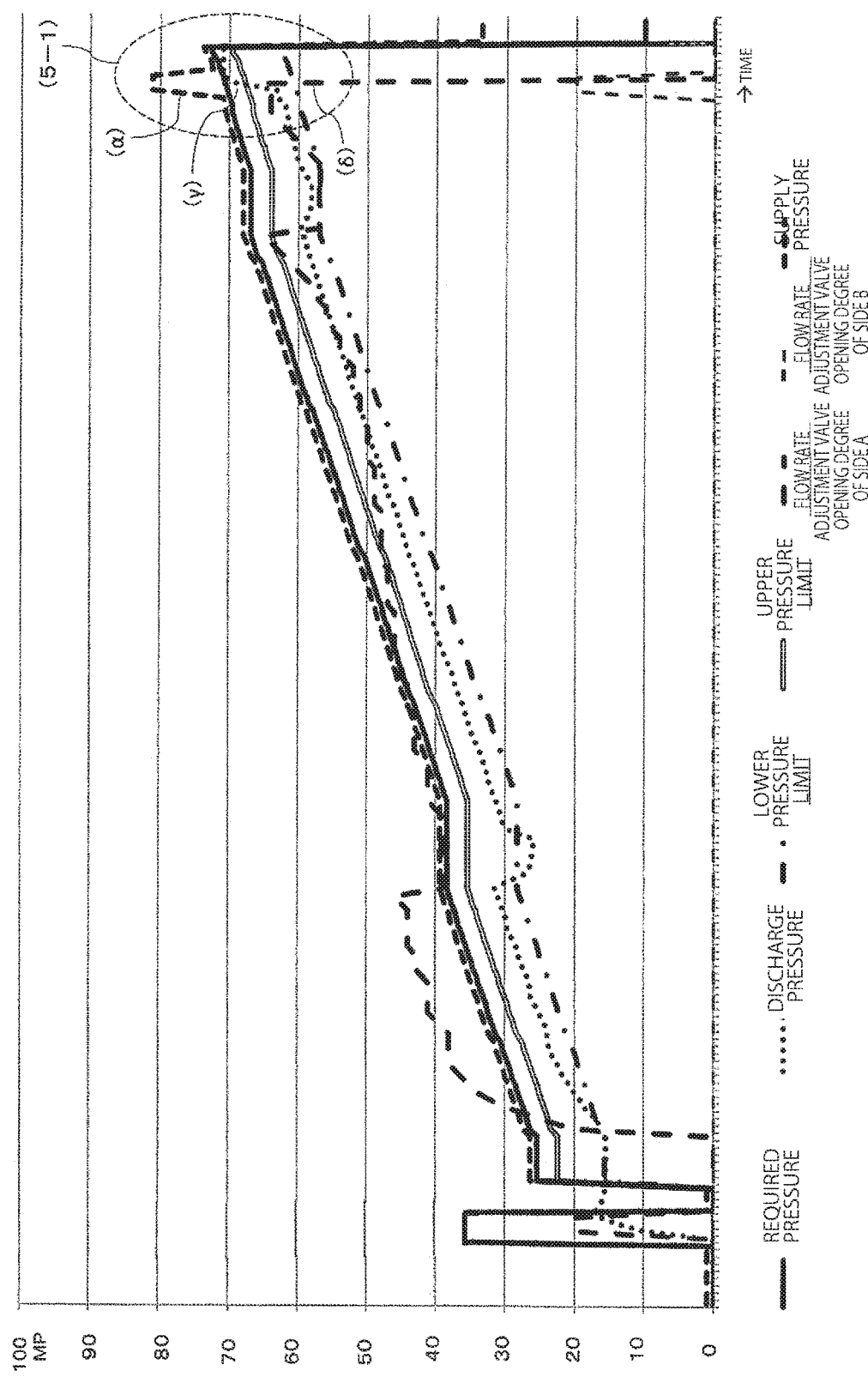
[Fig. 6]

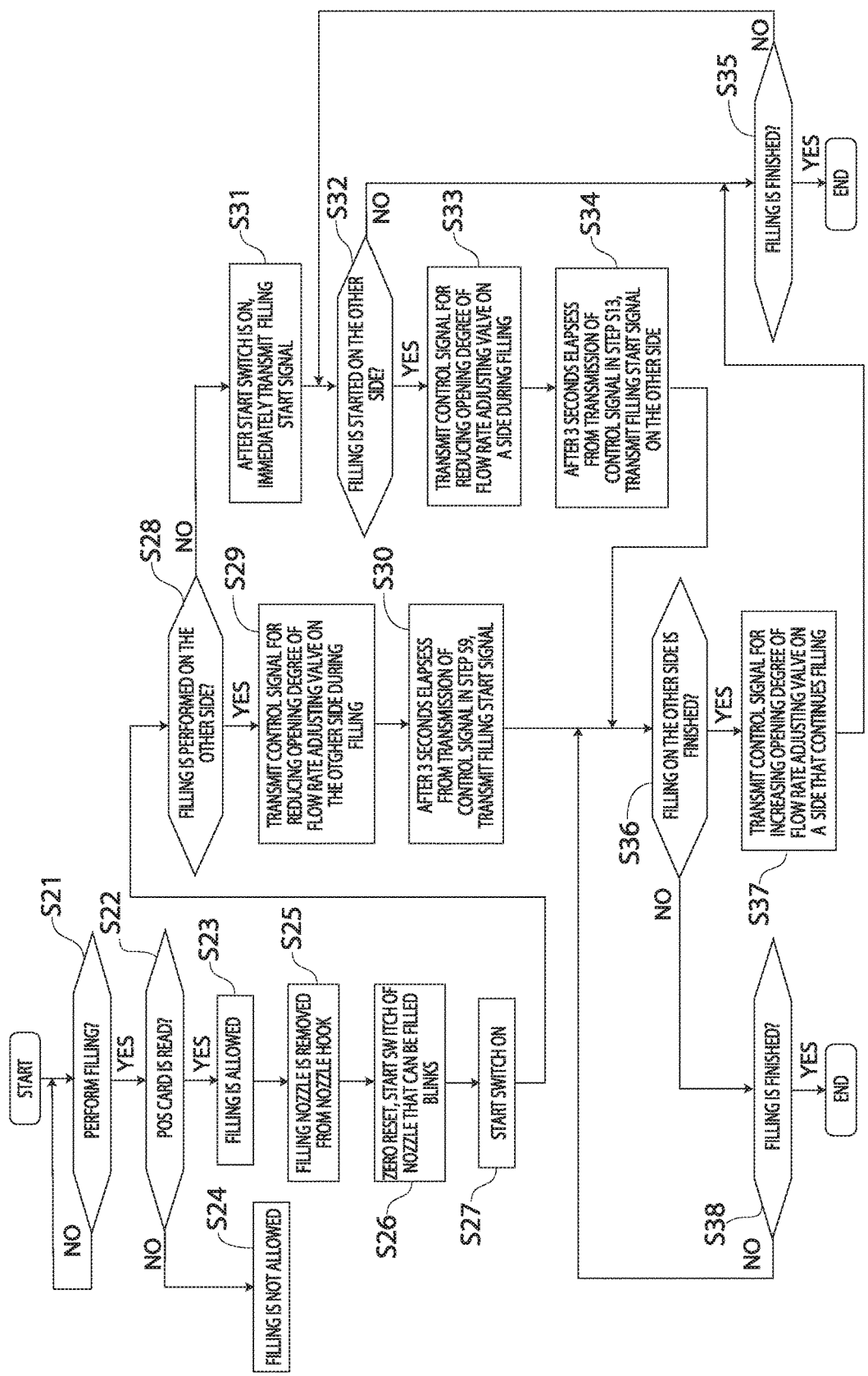

FILLING APPARATUS

CROSS-REFERENCE TO RELATED APPLICATIONS

The present application claims priority to Japanese Patent Application No. 2020-035495 filed on Mar. 3, 2020, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a filling apparatus for filling a fuel gas such as hydrogen gas.

2. Description of the Related Art

In recent years, with development and popularization of vehicles equipped with fuel cells (fuel cell vehicles: FCVs), it has become important to increase the number of hydrogen stations (see, for example, Japanese Patent Publication No. 2015-190521 gazette). The hydrogen station is provided with a hydrogen filling apparatus, and the apparatus fills an in-vehicle tank of a vehicle arriving at the hydrogen station with hydrogen within a predetermined pressure range.

Conventionally, when a fuel cell vehicle is filled with hydrogen at a hydrogen station, the pressure (required pressure) initially required from the hydrogen filling apparatus to a rear facility (fuel gas supply side, primary side) is fixed the maximum value (for example, 80 MPa). That is, the initial required pressure is set to a pressure (maximum value) that does not require a higher pressure on the rear facility side. Here, the pressure in the tank of the fuel cell vehicle cannot be the maximum pressure (for example, 80 MPa), and after requesting the maximum value (for example, 80 MPa) to the rear facility, the required pressure immediately decreases (for example, 30 MPa). Therefore, immediately after the start of hydrogen filling, the required pressure drops very significantly (for example, the pressure is lowered by 50 MPa), which causes a problem that a large load is applied to the rear facility.

On the other hand, if communication filling is established, the pressure in the tank of the fuel cell vehicle or the like is communicated to the hydrogen filling apparatus side, so that it is also possible to set the first required pressure from the hydrogen filling apparatus to the communicated tank pressure. However, depending on vehicle model, at a time of communication filling, it is set that a value different from an actual pressure in the tank is transmitted to the hydrogen filling apparatus side, and an accurate pressure in the tank is transmitted immediately after the start of gas filling. In such a type, if the initial required pressure is set to the pressure inside the tank of a fuel cell vehicle or the like, hydrogen cannot be filled if the actual pressure inside the tank is higher than the value communicated as the pressure inside the tank.

The content of Japanese Patent Publication No. 2015-190521 gazette is incorporated herein by reference in its entirety.

BRIEF SUMMARY

The present invention has been proposed in view of the above-mentioned problems of the prior art, and the object thereof is to provide a filling apparatus capable of reliably filling hydrogen to the fuel cell vehicle or the like without a significant dropping in the required pressure immediately after a start of hydrogen filling.

A filling apparatus (100) of the present invention includes a control unit (10), and the control unit (10) is characterized by having a function of boosting a pressure required to a rear facility (200: fuel gas supply side: primary side) (required pressure) from the hydrogen filling apparatus (100) until initial pressure measurement is completed. Here, the initial pressure is a discharge pressure of the filling apparatus (100) in a state where hydrogen is present in a filling hose immediately before filling, and is measured by a discharge pressure gauge (12) of the filling apparatus (100), and corresponds to a pressure in a side tank (21: for example, a tank of the fuel cell vehicle).

In the filling apparatus (100) of the present invention, it is preferable that the control unit (10) has a function of determining whether or not communication filling is established, and if the communication filling is established, setting a pressure higher than an internal pressure of a tank received from the vehicle side by a predetermined pressure (for example, 5 MPa) as a pressure required to the rear facility (200) at the initial stage of filling. Alternatively, it is preferable that, in the filling apparatus (100) of the present invention, the control unit (10) has a function of determining whether or not communication filling is established, and when communication filling is not established, setting a pressure of 30 to 60% (for example, 35 MPa) of a maximum value (for example, 80 MPa) as a pressure required to the rear facility (200) at the initial stage of filling.

Further, in the filling apparatus (100) of the present invention, it is preferable that, if flow rate (mass flow rate) of a gas to be filled is less than a predetermined value (for example, 100 g/min), the control unit (10) has a function of increasing the pressure required to the rear facility (200) from the filling apparatus (100). Further, in the present invention, it is preferable that, the control unit (10) has a function of setting a pressure required to the rear facility (200) higher than a measured internal pressure of a vehicle-side tank by a constant pressure (for example, 10 MPa) after the initial pressure measurement is completed.

A filling method of the present invention is characterized by having a step of determining whether or not initial pressure measurement is completed, and a step of increasing a pressure required to a rear facility (200: fuel gas supply side: primary side) from a hydrogen filling apparatus (100) until the initial pressure measurement is completed.

It is preferable that the filling method of the present invention includes steps of determining whether or not communication filling is established, and if the communication filling is established, setting a pressure higher than an internal pressure of a tank received from a vehicle side by a predetermined pressure (for example, 5 MPa) as a pressure required to the rear facility (200) at an initial stage of filling. Alternatively, it is preferable that the filling method of the present invention includes steps of determining whether or not communication filling is established, and when the communication filling is not established, setting a pressure of 30 to 60% (for example, 35 MPa) of a maximum value (for example, 80 MPa) as a pressure required to the rear facility (200) at the initial stage of filling.

Further, in the filling method of the present invention, if flow rate (mass flow rate) of a gas to be filled is less than a predetermined value (for example, 100 g/min), it is preferable to increase the pressure required to the rear facility (200) from the filling apparatus (100). Further, in the filling method of the present invention, after the initial pressure measurement is completed, it is preferable to set a pressure required to the rear facility (200) (required pressure) higher than a measured internal pressure of a vehicle-side tank by a constant pressure (for example, 10 MPa).

In carrying out the present invention described above, in a filling apparatus (100-1), a single fuel gas (for example, hydrogen) supply system (primary side supply system) branches to a plurality of filling systems (for example, side A filling system 1A and side B filling system 1B), and a plurality of control units (for example, side A control unit 10A and side B control unit 10B) for controlling each filling of the plurality of filling systems, and an intermediary control unit (10C) that mediates between the control units of the filling systems (for example, mediates between the side A control unit 10A and the side B control unit 10B) can be provided.

In this case, the intermediary control unit (10C) has, when starting filling in a filling system (for example, the filling system 1B of the side B) while filling in the other filling system (for example, the filling system 1A of the side A), a function of transmitting a filling start signal that is transmitted from the control unit (for example, the control unit 10B on the side B), which starts filling, to the control unit (for example, the control unit 10A on the side A), which performs filling, and it is preferable that the control unit (for example, the control unit 10A on the side A) that performs filling has, when receiving the filling start signal that is transmitted via the intermediary control unit (10C), a function of transmitting a control signal (for example, a control signal for reducing opening degree of the flow rate adjusting valve 2A) for reducing a pressure of the filling system on the filling side (for example, a pressure of hydrogen gas flowing through the filling system 1A on the side A). Then, it is preferable that the intermediary control unit (10C) has a function of transmitting a filling start signal transmitted by the control unit on the side that starts the operation (for example, the control unit 10B on the side B) to the fuel gas supply side (rear facility side: primary side) after a predetermined time (for example, three seconds) after the control unit on the filling side (for example, the control unit 10A on the side A) transmits a control signal for reducing the pressure.

It is preferable that the intermediary control unit (10C) has, when finishing filling in a filling system (for example, the filling system 1A of the side A) while filling in a plurality of filling systems (for example, the filling systems 1A, 1B of the side A, B), a function of transmitting a filling finish signal that indicates filling is finished at a filling system (for example, the filling system 1A of the side A) to the other control unit that continues filling (for example, the control unit 10B on the side B), and it is preferable that the control unit (for example, the control unit 10B on the side B) that continues filling has, when receiving the filling finish signal indicating that the filling at the other filling system (for example, the filling system 1A of the side A), which is transmitted via the intermediary control unit (10C), a function of transmitting a control signal (for example, a control signal for increasing the opening degree of the flow rate adjusting valve 2A) for increasing the pressure of the filling system on the filling side (for example, the pressure of hydrogen gas flowing through the filling system 1B on the side B).

Further, it is possible to mount a comprehensive intermediary control unit for connecting (intermediating) the intermediary control units (10C) provided in each of the plurality of filling apparatuses (100-1) with each other. And, three or more filling apparatuses (100-1) can be provided.

With the present invention having the above construction, the pressure required from the hydrogen filling apparatus (100) to the rear facility (200: fuel gas supply side: primary side) (required pressure) until the initial pressure measurement is completed) is boosted. Therefore, it is not necessary to fix the required pressure to the maximum value (for example, 80 MPa) as in the prior art, and the pressure is much lower than that, for example, a pressure higher only a predetermined value (for example, 5 MPa) than the pressure in the tank received from the vehicle side, or a pressure of 30 to 60% of the maximum value (for example, 35 MPa). As a result, the required value can be set much lower than the maximum value. Accordingly, it is possible to prevent the required pressure from being remarkably reduced immediately after a start of hydrogen filling, and it is also possible to prevent a large load from being applied to the rear facility (200).

In the present invention, even if the required value is set much lower than the maximum value, for example, if flow rate (mass flow rate) of a gas to be filled is less than a predetermined value (for example, 100 g/min), the required pressure is increased, which allows the tank in the vehicle to reliably be filled with a gas such as hydrogen. As a result, a situation where the required pressure is too low to be filled with gas is prevented.

Here, it is desirable when a plurality of vehicles arrive at a hydrogen station, hydrogen is filled in a plurality of systems (for example, a supply system on the front side of a hydrogen filling apparatus and a supply system on the back side) in order to improve filling efficiency. In order to fill hydrogen with a hydrogen filling apparatus, discharge pressure must be maintained within a predetermined pressure range during filling. However, if hydrogen filling is started on the other side while hydrogen is being filled on one side of the hydrogen filling apparatus, discharge pressure on the filling side fluctuates, making it difficult to keep the pressure within a predetermined pressure range. In the present invention, when a single fuel gas (for example, hydrogen) supply system (primary side supply system) is branched into a plurality of filling systems (for example, side A filling system 1A and side B filling system 1B), and a control unit that controls filling of each of the plurality of filling systems (for example, side A control unit 10A, side B control unit 10B), and an intermediary control unit 10C that mediates between the control units of the filling systems (for example, mediates between the side A control unit 10A and the side B control unit 10B), a single fuel gas (for example, hydrogen) supply system is branched into a plurality of filling systems (for example, side A filling system 1A and side B filling system 1B), so that it is possible to fill a fuel gas at a required pressure in accordance with a pressure difference from the filling target side (for example, vehicle-side tank 21) even if a hydrogen storage cylinder or a tank is not provided inside a filling apparatus. Then, a single filling apparatus (100-1) can supply a fuel gas to a plurality of filling targets. Further, since the intermediary control unit (10C) that mediates between the control units of the filling systems (for example, the control unit 10A on the side A and the control unit 10B on the side B) is provided, even when fuel gas is supplied to a plurality of filling targets, discharge pressure during filling can be maintained within a predetermined pressure range (lower than the upper limit and higher than the lower limit), which allows safety filling.

Specifically, when filling is started in one filling system while filling in another filling system, pressure of a fuel gas supplied to the filling apparatus (100-1) increases due to the start of the filling, and there is a risk that the discharge pressure on the filling system side during filling may exceed the upper limit. On the other hand, the mediation control unit (10C) sends a start signal, which is transmitted from the control unit on the side that starts filling (for example, the control unit 10B on the side B), to the control unit on the filling side (for example, the control unit 10A on the side A), and the filling side control unit (for example, the control unit 10A on the side A) transmits, when receiving the filling start signal transmitted via the mediation control unit (10C), a control signal (for example, a control signal for reducing the opening degree of the flow rate adjusting valve 2A) for reducing the pressure (for example, the pressure of hydrogen gas flowing through the filling system 1A on the side A), which prevents discharge pressure on the filling system side during filling (for example, the filling system 1A side of the side A) increases and exceeds the upper limit. Here, when a signal to start filling is transmitted to the fuel gas supply side (primary side), pressure on the fuel gas supply side rises. Therefore, if a timing at which the signal to start filling is transmitted to the fuel gas supply side and a timing at which the control signal for reducing the pressure on the filling system side during filling (for example, the pressure of hydrogen gas flowing on the filling system 1A side of side A) is transmitted are the same, the pressure on the fuel supply side and the discharge pressure on the filling system side during filling are increased earlier than the decompression on the filling system side during filling, and the discharge pressure on the system side may exceed the upper limit. However, if the mediation control unit (10C) has a function of transmitting the filling start signal of the control system (for example, the control unit 10B on the side B) that starts filling to the fuel gas supply side (rear facility side: primary side) after a predetermined time (for example, three seconds) after the filling system side control unit (for example, the control unit 10A on the side A) transmits the control signal for depressurizing (for example, reducing the opening degree of the flow rate adjusting valve 2A), decompression on the filling system side (for example, the filling system 1A side of side A) is always performed at an earlier a timing than increases in pressure on the fuel supply side and discharge pressure on the filling system side during filling, which surely prevents that the discharge pressure on the filling system side during filling exceeds the upper limit Further, when filling is completed in one of the filling systems while filling in a plurality of filling systems, pressure on the fuel gas supply side drops sharply, and there is a risk that the discharge pressure of the filling system that continues filling will fall below the lower limit. However, when the mediation control unit (10C) has a function of transmitting a control signal indicating that filling is finished at a filling system (for example, the filling system 1A on the side A) to another filling system that continues filling (for example, the control unit 10B on the side B), and the control unit of the filling system that continues filling (for example, the control unit 10B on the side B) has a function of transmitting a control signal for increasing pressure of the filling system (for example, for increasing the opening degree of the flow rate adjusting valve 2B) when receiving the control signal indicating that the filling is completed at the other side filling system (for example, the filling system 1A on the side A) via the mediation control unit (10C), it is prevented that the discharge pressure of the filling system (for example, the filling system 1B on the side B) that continues filling may fall below the lower limit.

BRIEF DESCRIPTION OF THE DRAWINGS

FIG. 1 is an explanatory drawing showing outline of a filling apparatus according to the first embodiment of the present invention.

FIG. 2 is a flow chart showing control in the first embodiment.

FIG. 3 is an explanatory drawing showing outline of the filling apparatus according to the second embodiment of the present invention.

FIG. 4 is a block diagram of a filling apparatus according to the second embodiment.

FIG. 5 is a characteristic diagram for explaining mode of filling in the second embodiment.

FIG. 6 is a characteristic diagram for explaining an inconvenience that occurs when filling request in a filling system of side B and control signal of a pressure regulating valve of side A are simultaneously transmitted.

FIG. 7 is a flow chart showing control in the second embodiment.

DETAILED DESCRIPTION

Hereinafter, embodiments of the present invention will be described with reference to the accompanying drawings. In the illustrated embodiments, a case where a gas to be filled is hydrogen is shown, but the filling apparatus according to the illustrated embodiments can also be applied to filling of other gases. First, the first embodiment of the present invention will be described with reference to FIGS. 1 and 2. In FIG. 1, the filling apparatus represented by the reference numeral 100 includes a hydrogen supply pipe 1, a flow meter 4, a flow rate adjusting valve 2 (pressure adjusting valve), a cooling unit 6 (gas pipeline cooling unit), a shutoff valve 3, and a control unit 10. An upstream side of the hydrogen supply pipe 1 is connected to a hydrogen gas supply source 200 (rear facility, primary side) via an accumulator 16, and a downstream side of the hydrogen supply pipe 1 is connected to a vehicle-side tank 21 of a vehicle 20 (fuel cell vehicle) via a filling hose 8 and a filling nozzle 9 (FIG. 1 shows filling time). The flow meter 4, the flow rate adjusting valve 2, the cooling unit 6, and the shutoff valve 3 are interposed in the hydrogen supply pipe 1. Hydrogen stored in the hydrogen gas supply source 200 (rear facility) is supplied into the vehicle-side tank 21 while passing through the hydrogen supply pipe 1 via the flow meter 4, the flow rate adjusting valve 2, the cooling unit 6, the shutoff valve 3, the filling hose 8, and the filling nozzle 9.

The control unit 10 acquires measurement result of the flow meter 4 via a measurement signal line Li1 and transmits a control signal to the flow rate adjusting valve 2 (pressure adjusting valve) via a control signal line Lo1. A conventionally known cooling unit 6 has a function of lowering temperature of a filled hydrogen when the vehicle-side tank 21 is filled with hydrogen, and the cooling unit 6 is, for example, an existing heat exchange device type. When filling ends or stops, the control unit 10 transmits a control signal to the flow rate adjusting valve 2 and the shutoff valve 3 via the control signal lines Lo1 and Lo2, respectively, and closes the flow rate adjusting valve 2 and the shutoff valve 3. The vehicle-side tank 21 is provided with a pressure sensor (not shown) that measures pressure inside the vehicle-side tank 21 and a temperature sensor (not shown) that measures temperature inside the vehicle-side tank 21.

When communication filling is established, pressure and temperature information in the vehicle-side tank 21 is transmitted to the control unit 10 via a vehicle-side control unit and a connector (not shown) and a measurement signal line Li2. When communication filling is established, the filling apparatus 100 (control unit 10) acquires information (pressure, temperature, etc.) of the vehicle-side tank 21 from the vehicle 20 side, and controls each equipment (flow rate adjusting valve 2, shutoff valve 3, flow meter 4, etc.) on the filling apparatus 100 side or receives measurement signals to supply hydrogen gas to the vehicle-side tank 21 within an appropriate pressure range according to the filling protocol, that is, performing hydrogen filling.

In FIG. 1, the hydrogen supply pipe 1 of the hydrogen filling apparatus 100 is provided with an inlet pressure gauge 11 (inlet pressure sensor) and a discharge pressure gauge 12 (discharge pressure sensor). The inlet pressure gauge 11 measures a pressure on the hydrogen gas supply source 200 side (rear facility side) in the hydrogen supply pipe 1, and transmits the measurement result to the control unit 10 via a measurement signal line Li3. The discharge pressure gauge 12 measures a pressure on the filling nozzle 9 side in the hydrogen supply pipe 1, and transmits the measurement result to the control unit 10 via a measurement signal line Li4. Further, an outlet side thermometer 13 (temperature sensor) is interposed in the hydrogen supply pipe 1, the outlet side thermometer 13 measures a temperature in the hydrogen supply pipe 1, and transmits the measurement result to the control unit 10 via a measurement signal line Li5.

In FIG. 1, the control unit 10 of the filling apparatus 100 is connected to the rear facility 200 (hydrogen gas supply source, primary side) with a control signal line Lo3, and the control unit 10 has a function of transmitting a control signal of a required pressure (pressure of hydrogen gas supplied by the rear facility 200 to the filling apparatus 100) via the control signal line Lo3 to the rear facility 200 during a period until initial pressure measurement is completed. Here, the initial pressure is a discharge pressure of the filling apparatus (100) in a state where hydrogen is present in the filling hose immediately before filling, and is measured with the discharge pressure gauge (12) of the filling apparatus (100), and the pressure corresponds to a pressure in a vehicle-side tank (21: for example, a tank of a fuel cell vehicle) at that time. As described above, the control unit 10 has a function of determining whether or not a communication filling system between the filling apparatus 100 and the vehicle-side tank 21 has been established. As will be described later, when the control unit 10 boosts a required pressure to the rear facility 200 (hydrogen gas supply source, primary side), control mode when the communication filling system is established is different from that when the communication filling system is not established.

The control unit 10 (filling apparatus 100) has a function of setting a pressure higher than a pressure received from the vehicle 20 side by a predetermined pressure (for example, 5 MPa) as a required pressure for the rear facility 200 until initial pressure measurement is completed when a communication filling system is established (when the control unit 10 receives a pressure and a temperature in the tank 21 on the vehicle side). As will be described later in FIG. 2, the control unit 10 has a function of executing control for gradually increasing the required pressure as needed at the stage of initial pressure measurement. In an example described later in FIG. 2, the required pressure is boosted in the order of "received tank pressure+5 MPa" →"received tank pressure+15 MPa"→"required pressure 80 MPa". The control to gradually increase the required pressure is executed based on hydrogen flow rate (mass flow rate). That is, in a period until the pressure measurement in the vehicle-side tank 21 is completed and the communication filling system is established, the control unit 10 gradually increases the required pressure to the rear facility 200 (hydrogen gas supply side) if the flow rate (mass flow rate) to be filled is less than a predetermined value (for example, 100 g/min) based on the flow rate measurement value from the flow meter 4. The details will be described later with reference to FIG. 2. Whether or not the initial pressure measurement is completed is executed by a conventionally known method.

The control unit 10 has a function of setting a pressure of 30 to 60% of the maximum value (for example, 80 MPa), for example, 35 MPa as a pressure requested to the rear facility 200 (a pressure of hydrogen gas that the rear facility 200 supplied to the filling apparatus 100) at the beginning of filling when the communication filling system is not established (when the control unit 10 does not receive a pressure and a temperature in the vehicle-side tank 21). Even if the communication filling system has not been established, the control unit 10 has a function of executing control to gradually increase the required pressure as needed in the process of initial pressure measurement. For example, the required pressure is increased in the order of "35 MPa"→"50 MPa"→"80 MPa". The control to gradually increase the required pressure is performed based on the hydrogen flow rate (mass flow rate) as in the case where the communication filling system is established. That is, in the period until the pressure measurement in the vehicle-side tank 21 is completed and the communication filling system is not established, the control unit 10 stepwise increases the required pressure to the rear facility 200 based on the flow rate measurement value from the flow meter 4 when the hydrogen flow rate (mass flow rate) to be filled is less than a predetermined value (for example, 100 g/min).

Further, in FIG. 1, the control unit 10 has a function of setting the required pressure to a higher pressure by a constant pressure (for example, 10 MPa) than the measured pressure inside the vehicle-side tank 21 to the rear facility 200 when the communication filling system is established or the communication filling system is not established, after the pressure measurement in the vehicle-side tank 21 is completed. This is to smoothly shift to a subsequent filling control.

In FIG. 1, the hydrogen filling apparatus 100 is provided with a switch unit 14, and the switch unit 14 includes a charging start switch 14A that operates at a start of hydrogen filling, and a filling stop switch 14B that operates when hydrogen filling ends and filling is stopped, an emergency stop switch 14C that operates at a time of an emergency stop. The operation of each of the switches 14A to 14C in the switch unit 14 is transmitted to the control unit 10 via an input signal line Li6. Further, the hydrogen filling apparatus 100 is provided with a display device 15, which has a function of acquiring a control signal transmitted from the control unit 10 via the control signal line Lo4 and displaying various parameters (hydrogen mass filled in a vehicle at that time and others).

Next, the control in the first embodiment will be described with reference to FIG. 2. In FIG. 2, in step S1, measurement of an initial pressure is started by the discharge pressure gauge 12. Then, the process proceeds to step S2. In step S2, it is determined whether or not vehicle communication filling is established (whether or not the control unit 10 receives a pressure and a temperature in the vehicle-side tank 21). This determination is executed by the control unit

10. If the vehicle communication filling is established (step S2 is "Yes"), the process proceeds to step S3, and if vehicle communication filling is not established (step S2 is "No"), the process proceeds to step S10.

In step S3 (when vehicle communication filling is established), the required pressure to the rear facility 200 (pressure of hydrogen gas supplied by the rear facility 200 to the filling apparatus 100) is set to be higher than a pressure in the tank received from the vehicle side by, for example, 5 MPa (predetermined pressure). Such a setting is executed as a function of the control unit 10. Then, the process proceeds to step S4.

In step S4, the control unit 10 determines whether or not the initial pressure measurement is completed when 5 seconds have passed since the required pressure was set to a pressure 5 MPa higher than the tank pressure received from the vehicle side in step S3. At the same time, in step S4, whether or not the hydrogen flow rate (mass flow rate) is, for example, less than 100 g/min (predetermined value) is judged. The control unit 10 acquires measurement result of the flow meter 4 and executes the determination. When the measurement of the initial pressure is not completed 5 seconds after the required pressure is set, and the hydrogen flow rate (mass flow rate) to be filled is less than 100 g/min (predetermined value) (step S4 is "Yes"), the process proceeds to step S5. On the other hand, the measurement of the initial pressure is completed 5 seconds after the required pressure setting, or the hydrogen flow rate (mass flow rate) to be filled is not less than 100 g/min (predetermined value) (step S4 is "No"), the process proceeds to step S8.

In step S5 (when the initial pressure measurement is not completed 5 seconds after the required pressure setting and the hydrogen mass flow rate to be filled is less than 100 g/min), the required pressure to the rear facility 200 is set to a pressure higher than the tank pressure received from the vehicle side by, for example, 15 MPa (increasing the required pressure from the time of step S3: "tank pressure+5 MPa"→"tank pressure+15 MPa"). The setting is executed by transmitting the control signal from the control unit 10 to the rear facility 200. Then, the process proceeds to step S6.

In step S6, it is judged whether or not the initial pressure measurement is completed when 5 seconds have passed since the required pressure was set to a pressure 15 MPa higher than the tank pressure received from the vehicle side in step S5. At the same time, it is judged the hydrogen flow rate (mass flow rate) to be filled is less than, for example, 100 g/min. When the initial pressure measurement is not completed 5 seconds after the required pressure setting, and the hydrogen flow rate to be filled is less than 100 g/min (step S6 is "Yes"), the process proceeds to step S7. On the other hand, the measurement of the initial pressure is completed 5 seconds after the required pressure setting, or the hydrogen flow rate to be filled is not less than 100 g/min (step S6 is "No"), the process proceeds to step S8.

In step S7 (when the initial pressure measurement is not completed 5 seconds after the required pressure setting and the hydrogen flow rate to be filled is less than 100 g/min), the required pressure to the rear facility 200 is set to, for example, the maximum value of 80 MPa. This setting is also executed by transmitting the control signal from the control unit 10 to the rear facility 200. Then, the process proceeds to step S8. In step S8, the measurement of the initial pressure is finished, and the process proceeds to step S9. In step S9, the required pressure to the rear facility 200 is set to be higher than the measured initial pressure by, for example, 10 MPa (constant pressure). Then, the process proceeds to step S18.

As described above, in FIG. 2, if the communication filling system has not been established, the process proceeds to step S10. In step S10, the required pressure to the rear facility 200 is set to, for example, 35 MPa. Here, 35 MPa is set as an example of a pressure in the range of 30 to 60% of the maximum value (for example, 80 MPa). Then, the process proceeds in step S11.

In step S11, it is determined whether or not the measurement of the initial pressure is completed 5 seconds after the required pressure is set (to 35 MPa). At the same time, it is determined whether or not the hydrogen mass flow rate to be filled is less than, for example, 100 g/min. When the initial pressure measurement is not completed 5 seconds after the required pressure setting, and the hydrogen flow rate (mass flow rate) to be filled is less than 100 g/min (step S11 is "Yes"), the process proceeds to step S12. On the other hand, the measurement of the initial pressure is completed 5 seconds after the required pressure setting, or the hydrogen flow rate (mass flow rate) to be filled is not less than 100 g/min (predetermined value) (step S11 is "No"), the process proceeds to step S15.

In the next step S12 (when the measurement of the initial pressure is not completed 5 seconds after the required pressure setting and the hydrogen flow rate (mass flow rate) to be filled is less than 100 g/min), the required pressure to the equipment 200 is set to, for example, 50 MPa. In step S12, the required pressure is higher than that in step S10 ("35 MPa"→"50 MPa"). Then, the process proceeds to step S13.

In step S13, it is determined whether or not the measurement of the initial pressure is completed when 5 seconds have passed since the required pressure was set (to 50 MPa) in step S12. At the same time, it is determined whether or not the hydrogen flow rate (mass flow rate) to be filled is less than, for example, 100 g/min. When 5 seconds have passed from the required pressure setting, the measurement of the initial pressure is not completed, and the hydrogen mass flow rate to be filled is less than 100 g/min (step S13 is "Yes"), the process proceeds to step S14. On the other hand, when the measurement of the initial pressure is completed 5 seconds after the required pressure setting, or the hydrogen mass flow rate to be filled is not 100 g/min (step S13 is "No"), the process proceeds to step S15.

In step S14 (when the measurement of the initial pressure is not completed when 5 seconds have passed from the required pressure setting and the hydrogen mass flow rate to be filled is less than 100 g/min), the request pressure to the rear facility 200 is set to, for example, the maximum value of 80 MPa. This setting is also executed by transmitting the control signal from the control unit 10 to the rear facility 200. Then, the process proceeds to step S15. In steps S10 to S14, the required pressure is gradually increased as needed to ensure that the vehicle-side tank 21 is filled with hydrogen gas.

In step S15, the measurement of the initial pressure is completed, and the process proceeds to step S16. In step S16, the required pressure to the rear facility 200 is set higher than the measured initial pressure by, for example, 10 MPa (constant pressure). Then, the process proceeds to step S17. In step S17, a process of estimating capacity of the vehicle-side tank 21 (for example, a process of determining whether mass capacity of the vehicle-side tank 21 is in a range of 2 to 10 kg or exceeds 10 kg) is executed. Since communication filling has not been established in step S17, such processing is required. After executing the tank capacity estimation process, the process proceeds to step S18. In step S18, filling control is executed. Specific control procedure of the filling control will be described later with reference to the flowchart of FIG. 7 regarding the second embodiment.

With the first embodiment shown in FIGS. 1 and 2, pressure required from the control unit 10 (hydrogen filling apparatus 100) to the rear facility 200 (fuel gas supply side, primary side) (required pressure) is boosted until pressure measurement in the vehicle-side tank 21 is completed. When the communication filling system is established, the required pressure from the control unit 10 (filling apparatus 100) to the rear facility 200 is set to a pressure higher than a tank pressure received by the control unit 10 from the vehicle side, for example, by 5 MPa (predetermined pressure) at the beginning of filling. After that, in the process of initial pressure measurement, when the hydrogen flow rate (mass flow rate) to be filled is less than, for example, 100 g/min (predetermined value), the required pressure is gradually increased to, for example, "received tank internal pressure+15 MPa" and further "80 MPa". On the other hand, when the communication filling system has not been established, the required pressure from the control unit 10 to the rear facility 200 is set to, for example, 35 MPa at the beginning of filling. After that, in the process of initial pressure measurement, when the hydrogen flow rate (mass flow rate) to be filled is less than, for example, 100 g/min, the required pressure is gradually increased to, for example, "50 MPa" and further "80 MPa". Execution of this control eliminates need to fix the required pressure to the maximum value (for example 80 MPa) as in the prior art, and it can be set to much lower pressures, for example pressures higher than the tank pressure received from the vehicle side by 5 MPa (when the communication filling system is established) or 35 MPa (when the communication filling system is not established). Furthermore, if necessary, the pressure can be set to a pressure 15 MPa higher than the tank pressure received from the vehicle side (when the communication filling system is established) or 50 MPa (when the communication filling system is not established). As a result, the required value can be set much lower than the maximum value. Therefore, it is possible to prevent the required pressure from being remarkably reduced immediately after a start of hydrogen filling, and it is also possible to prevent a large load from being applied to the rear facility 200.

Then, with the first embodiment, even if the required pressure value is set to a pressure much lower than the maximum value of 80 MPa, if the hydrogen mass flow rate is less than, for example, 100 g/min, it is determined that the required pressure is too low and hydrogen is not preferably filled, and the required pressure is increased. Therefore, the tank in the vehicle can be reliably filled with a gas such as hydrogen. Further, with the first embodiment, after the pressure measurement in the vehicle-side tank 21 is completed, the required pressure to the rear facility 200 is set to a pressure higher than the vehicle-side tank 21 internal pressure by, for example, 10 MPa (constant pressure). Therefore, it is possible to smoothly shift to the subsequent filling control.

Next, the second embodiment of the present invention will be described with reference to FIGS. 3 to 7. In FIG. 3, a filling apparatus 100-1 is connected to a single hydrogen supply system (primary side supply system) (not shown), and a cylinder or a tank for storing hydrogen is not provided inside the filling apparatus 100-1. The filling apparatus 100-1 has a plurality of systems (two systems in the second embodiment) (filling system 1A on the side A and filling system 1B on the side B: see FIG. 4) (or branched into two filling systems), and the side A and the side B constitute both front and back surfaces of the filling apparatus 100-1. In the example of FIG. 3, the front surface side (FIG. 3 (A) side) of the filling apparatus 100-1 is the side A, and the back-surface side (FIG. 3 (B) side) is the side B.

In the filling apparatus 100-1, when filling a vehicle (not shown) using hydrogen as fuel, hydrogen is supplied at a required pressure while controlling according to a pressure difference from a working pressure of the hydrogen tank mounted on the vehicle. In the filling apparatus 100-1 of FIG. 3, a total of three filling nozzles are provided on both sides (side A in FIG. 3(A) and side B in FIG. 3(B)). Here, the indication "H70" in FIG. 3 indicates a filling nozzle for 70 MPa, and the indication "H35" indicates a filling nozzle for 35 MPa. In the filling apparatus of FIG. 3, two filling nozzles H70 for 70 MPa and one filling nozzle H35 for 35 MPa are provided. On the side A shown in FIG. 3(A), for example, a filling nozzle H70 for 70 MPa and a filling nozzle H35 for 35 MPa are provided. Hydrogen is supplied to the filling nozzle H70 via a filling hose 4A1 from the hydrogen supply system on the primary side (not shown) and the filling system 1A (see FIG. 4) of the filling apparatus 100-1 to the filling nozzle H35 via a filling hose 4A2. For example, only one filling nozzle H70 for 70 MPa is provided on the side B of FIG. 3(B), and hydrogen is supplied from the hydrogen supply system on the primary side (not shown) to the filling nozzle H70 via the filling system 1B and the filling hose 4B of the filling apparatus 100-1. The side A in FIG. 3 (A) has an operation panel 5A, and the side B in FIG. 3 (B) has an operation panel 5B. Reference numerals 7A1, 7A2, and 7B in FIG. 3 indicate nozzle hooks.

Hydrogen can be filled with two filling nozzles at the same time on the side A and the side B of the filling apparatus 100-1. For example, using the filling nozzle H70 for 70 MPa on the side A and the filling nozzle H70 for 70 MPa on the side B, it is possible to simultaneously fill two vehicles (not shown) on both the side A and the side B. Or, using the filling nozzle H35 for 35 MPa on the side A and the filling nozzle H70 for 70 MPa on the side B, it is possible to simultaneously fill two vehicles. Although not clearly shown, it is configured such that it cannot be filled at the same time with the filling nozzle H70 for 70 MPa and with the filling nozzle H35 for 35 MPa on the side A, for example, the filling is stopped. In other words, it is configured such that it cannot be filled at the same time by two filling nozzles on the same side (side A in FIG. 3). Therefore, the side A and the side B can be filled simultaneously by a total of two systems, but the side A cannot be filled simultaneously by two systems. In an actual apparatus, if the second filling nozzle of the side A comes off during the filling of the side A, it is determined that the two filling nozzles of the side A are trying to fill, and the filling is stopped.

In FIG. 4, the filling apparatus 100-1 is connected to a primary side supply system which is a single hydrogen gas supply system. Here, the supply system on the primary side is a rear facility side of the filling apparatus 100-1, and is provided on the left side in FIG. 4. In the filling apparatus 100-1, a supply path communicating with the supply system on the primary side is branched into two filling systems at a branching point B1, that is, the filling system 1A on the side A and the filling system 1B on the side B. The filling system 1A of the side A is connected to a tank (not shown: presents on the right side in FIG. 4) of a vehicle (not shown) via the filling nozzles H70 and H35 at a time of filling. On the other hand, the filling system 1B of the side B is connected to a tank (not shown: presents on the right side in FIG. 4) of a vehicle (not shown) via the filling nozzle H70 at a time of filling.

The filling system 1A on the side A further branches into two filling systems 1A-1 and 1A-2 at a branching point B2. The filling system 1A-1 is connected to the filling nozzle H70 for 70 MPa, and the filling system 1A-2 is connected to the filling nozzle H35 for 35 MPa. In the present specification, the filling system 1A, the filling system 1A-1 and the filling system 1A-2 on an upstream side (primary side) of the branch point B2 may be collectively referred to as "filling system 1A". The filling system 1B of the side B is connected to the filling nozzle H70 for 70 MPa. The filling nozzles H70 and H35 on the side A and the side B are provided with nozzle switches SW70 and SW35 (start switches). The nozzle switches SW70 and SW35 are each turned "ON" by the user when starting filling. As is clearly shown in FIG. 4, there is only one primary side supply system for supplying hydrogen to the filling apparatus 100-1 according to the second embodiment, but the primary side hydrogen supply system of the one system branches at a single point or a plurality of points (for example, two branch points B1 and B2 in FIG. 4) before reaching the filling nozzle and communicates with a plurality of hydrogen filling nozzles H70 or H35 to constitute a filling system. In the second embodiment shown in FIGS. 3 and 4, three filling systems are configured. Unlike the filling apparatus according to the prior art, a gas fuel (hydrogen gas) is not supplied to the filling apparatus from a plurality of gas supply sources via a plurality of supply systems. The filling apparatus 100-1 according to the illustrated embodiment is not used for supplying CNG gas to a vehicle, unlike the conventional filling apparatus. However, it is possible to apply the illustrated embodiment to supply CNG gas.

Again in FIG. 4, an inlet pressure gauge PA1, a flow rate adjusting valve 2A (pressure adjusting valve), and a cooling unit 6 are arranged in a region between the branching point B1 and the branching point B2 of the filling system 1A on the side A. A shutoff valve 3A1, a discharge pressure gauge PA21, and an outlet side thermometer TA1 are arranged in a region between the branch portion B2 and the filling nozzle H70 in a filling system 1A-1. Further, a shutoff valve 3A2, a discharge pressure gauge PA22, and an outlet side thermometer TA2 are arranged in the region between the branch portion B2 and the filling nozzle H35 in a filling system 1A-2. In the filling system 1B of the side B, in the region between the branch point B1 and the filling nozzle H70, an inlet pressure gauge PB1, a flow rate adjusting valve 2B, a cooling unit 6, a shutoff valve 3B, a discharge pressure gauge PB2, and an outlet side thermometer TB are placed.

In FIG. 4, the inlet pressure gauges PA1 and PB1 detect a hydrogen gas pressure in the filling system 1A and 1B in a region near the supply system side (upstream side) on the primary side of the filling apparatus 100-1, that is, a hydrogen gas supply pressure. The flow rate adjusting valves 2A and 2B have a function of increasing or decreasing flow rate of hydrogen gas flowing through the filling systems 1A and 1B by increasing or decreasing opening degree thereof, thereby adjusting pressure of the hydrogen gas. The cooling unit 6 has a function of cooling the hydrogen gas flowing through the filling systems 1A and 1B to lower the temperature. Here, the existing heat exchanger type cooling unit 6 is used, but it is preferable to use a high-power cooling unit because it cools the hydrogen flowing through the two hydrogen filling systems 1A and 1B. Further, the shutoff valves 3A1, 3A2, and 3B are opened when filling with the filling nozzles H70 or H35, and shut off when filling is completed to stop supply of hydrogen gas.

The discharge pressure gauges PA21, PA22, and PB2 detect pressures (discharge pressures) of hydrogen gases in regions near the filling nozzles H70 and H35 of the filling systems 1A-1, 1A-2, and 1B respectively. The outlet-side thermometers TA1, TA2, and TB detect temperatures of hydrogen gases in regions near the filling nozzles H70 and H35 in the filling systems 1A-1, 1A-2, and 1B respectively. A regulator (not shown) for reducing a hydrogen pressure of 70 MPa to 40 MPa is provided on an upstream side (branch portion B2 side) of the shutoff valve 3A2 in the filling system 1A-2. A card reader Pβ is provided on each operation panel of the side A and the side B. The card reader Pβ has a function of reading a dedicated card inserted by a user of the filling apparatus 100-1, and determines the user is a member or a non-member based on whether or not the card reader Pβ has read the dedicated card. That is, if the card reader Pβ reads a dedicated card, the user of the filling apparatus 100-1 determines that it is a member, and if it does not read it, it determines that it is a non-member.

In FIG. 4, the filling apparatus 100-1 has a side A control unit 10A, a side B control unit 10B, and an intermediary control unit 10C. The side A control unit 10A performs filling control in the filling system 1A, filling system 1A-1, and 1A-2 of the side A. The side B control unit 10B controls the filling of the side B filling system 1B. The mediation control unit 10C has a function of mediating between the side A control unit 10A in the filling system 1A and the side B control unit 10B in the filling system 1B, and makes it possible that the side A control unit 10A and the side B control unit 10B transmit information in both directions. The side A control unit 10A is connected to components of the filling system 1A on the side A with measurement signal lines, detection signal lines, and control signal lines. That is, the side A control unit 10A is connected to the inlet pressure gauge PA1 with a measurement signal line L1, to the flow rate adjusting valve 2A (pressure adjusting valve) with a control signal line L2, to the shutoff valve 3A1 with a control signal line L3, to the discharge pressure gauge PA21 with a measurement signal line L4, to the outlet side thermometer TA1 with a measurement signal line L5, and to the nozzle switch SW70 (start switch) with a detection signal line L6. Further, the side A control unit 10A is connected to the shutoff valve 3A2 with a control signal line L7, to the discharge pressure gauge PA22 with a measurement signal line L8, to the outlet side thermometer TA2 with a measurement signal line L9, and to the nozzle switch SW35 (start switch) with a detection signal line L10. Each of the signal lines L1 to L10 is independently connected to the control unit 10A on the side A, but in order to avoid complication, in FIG. 4, in a region where a plurality of signal lines are parallel may be displayed only one signal line.

The side B control unit 10B is connected to components of the side B filling system 1B with measurement signal lines, detection signal lines, and control signal lines. That is, the side B control unit 10B is connected to the inlet pressure gauge PB1 with a measurement signal line L11, to the flow rate adjusting valve 2B with a control signal line L12, to the shutoff valve 3B with a control signal line L13, to the discharge pressure gauge PB2 with a measurement signal line L14, to the outlet side thermometer TB with a measurement signal line L15, and to the nozzle switch SW70 (start switch) with a detection signal line L16. Each of the signal lines L11 to L16 is independently connected to the control unit 10B of the side B, but in order to avoid complication, in an area where a plurality of signal lines are parallel may be displayed only one signal line in the same manner as the side A. The side A control unit 10A and the mediation control unit 10C are connected with a signal line L17 capable of transmitting information or various signals in both directions. The side B control unit 10B and the mediation control unit 10C are also connected with a signal line L18 capable of transmitting bidirectional information or various signals. Although not shown in FIG. 4, a control unit is also provided in the rear facility (the supply system on the primary side of hydrogen gas), and the control unit on the primary side, the side A control unit 10A, the side B control unit 10B and the intermediary control unit 10C execute filling control in the filling apparatus 100-1.

The side A control unit 10A has a function of exchanging information and control signals with each component (pressure gauge, flow rate adjusting valve, etc.) of the filling system 1A of the side A, and supplying hydrogen gas at an appropriate pressure corresponds to, for example, a pressure difference from inside of the vehicle-side tank. The same applies to the side B control unit 10 B. Then, the filling apparatus 100-1 can fill a plurality of vehicles with hydrogen gas at the same time. Although not clearly shown, a pressure and a temperature of a tank on a vehicle side to be filled with hydrogen gas are transmitted to the filling apparatus 100-1 side with the communication filling system at a time of filling. Here, a pressure of hydrogen supplied from the supply system on the primary side to the filling apparatus 100-1 is determined based on a higher required filling pressure of the side A and the side B. For example, when 35 MPa of hydrogen gas is supplied to the side A side and 70 MPa of hydrogen gas is supplied to the side B side, the pressure of the supply system on the primary side is 70 MPa, which is a higher pressure. In this case, on the side A, opening degree of the flow rate control valve 2A is adjusted (throttled), and the pressure of the supplied hydrogen gas is lowered from 70 MPa to 35 MPa.

In FIG. 4, the control unit 10A on the side A and the control unit 10B on the side B execute control for exchanging information on hydrogen filling with each other via the mediation control unit 10C. The exchange of the information is executed via the bidirectional signal lines L17 and L18 as described above. The control executed by the control units 10A and 10B of the sides A and B and the mediation control unit 10C when filling a tank of a vehicle with hydrogen gas in both the filling systems 1A and 1B of the sides A and B within a predetermined pressure range will be described.

The control units 10A and 10B transmit the filling status in the filling systems 1A and 1B or information thereof to the intermediary control unit 10C. That is, the control units 10A and 10B transmit a filling start signal to the mediation control unit 10C when starting filling, and transmit a filling end signal when filling is completed. The mediation control unit 10C has a function of transmitting the filling start signal and the filling end signal to the rear facility side (hydrogen gas supply equipment side: primary side). Then, the mediation control unit 10C has, when filling starts in the filling system 1B of the side B while filling being performed in the filling system 1A of the side A, a function of transmitting the filling start signal transmitted by the control unit 10B to the control units 10A of the filling system 1A that performs filling. With such a function, the control units 10A and 10B can obtain information on filling on the other side. In the following, with reference to FIGS. 4 to 6, a case where the filling system 1B of the side B starts filling while the filling system 1A of the side A performs filling will be described. Here, as described above, since the filling system 1A-1 and the filling system 1A-2 on the side A are not filled at the same time, in the below explanation with reference to FIGS. 4 to 6, the filling systems 1A-1 and 1A-2 branched from the branching point B2 are comprehensively expressed as "filling system 1A".

Details will be described later with reference to FIGS. 5 and 6, but in FIG. 4, the control unit 10A on the side A has, when receiving the filling start signal transmitted from the control unit 10B via the mediation control unit 10C, a function of transmitting a control signal (a control signal that reduces the opening degree of the flow rate adjusting valve 2A to lower the pressure of the hydrogen gas) to the flow rate adjusting valve 2A to reduce the pressure of the hydrogen gas in the filling system 1A of the side A. Then, the mediation control unit 10C has, after a predetermined time (for example, three seconds) after the control unit 10A on the side A that performs filling transmits a control signal (control signal to the flow rate adjusting valve 2A) for reducing pressure, a function of transmitting a filling start signal transmitted by the side B control unit 10B that starts filling to a control unit of a rear facility (primary side supply system of hydrogen gas) (not shown). The reason for providing a time difference of a predetermined time (for example, three seconds) from the transmission of the control signal for reducing the hydrogen gas pressure of the side A to the transmission of the filling start signal of the side B to the control unit of the rear facility will be described later with reference to FIGS. 5 and 6.

Further, in FIG. 4, the intermediary control unit 10C has, when filling is performed in the filling systems 1A and 1B of the sides A and B at the same time, and for example, the filling is completed in the filling system 1A of the side A, a function of transmitting a control signal, which indicates that filling is completed on the side A, to the control unit 10B. Then, when receiving the control signal (control signal indicating that the filling is completed at the side A) transmitted via the intermediary control unit 10C, the control unit 10B of the side B that continues filling transmit a control signal for increasing the pressure of the hydrogen gas flowing a flow passage of the control unit 10B of the B to increase the pressure of the hydrogen gas by increasing opening degree of the flow rate adjusting valve 2B.

Next, the controls by the control units 10A and 10B and the mediation control unit 10C will be further described with reference to FIGS. 5 and 6. FIGS. 5 and 6 illustrate a case where the side A and the side B perform filling of 70 MPa. In FIG. 5, the horizontal axis shows elapsed time, the vertical axis shows various pressures or valve openings of the hydrogen gas to be filled, and filling modes on the side A and the side B are shown by pressure-time characteristics. Specifically, those figures show, after the start of filling, required pressure (pressure required for filling in each filling system), actual supply pressure (primary pressure: measured by inlet pressure gauges PA1 and PB1 in FIG. 4), discharge pressures (measured by discharge pressure gauges PA21, PA22, PB2), pressure allowable upper limit value, pressure allowable lower limit value, opening degree of flow rate adjustment valve (2A, 2B) for each of the filling system 1A on the side A and the filling system 1B on the side B change in what way.

In FIG. 5, at first, at a stage indicated by reference numeral (1), there is a request for filling in the filling system 1A on the side A, and the required pressure and the supply pressure increase in accordance with the required hydrogen gas pressure. Here, at the stage of reference numeral (1), the pressure in the vehicle-side tank to be filled is unknown, and the control until the measurement of the initial pressure in the first embodiment is completed is executed. FIG. 5 shows a case where communication filling is established, and a pressure higher than the tank pressure received from the vehicle side by, for example, 5 MPa (predetermined pressure) is set as the required pressure. If the hydrogen filling is not performed preferably (when the initial measurement is not completed and hydrogen gas flow rate is less than 100 g/min: see FIG. 2), the required pressure is set to be higher than the pressure in the tank received from the vehicle side by 15 MPa for example. Further, if the hydrogen filling is still not performed preferably, the required pressure is set to, for example, the maximum value of 80 MPa. After the initial pressure measurement is completed, the required pressure is set to a pressure higher than the measured tank pressure, for example, by 10 MPa. In FIG. 5, the required pressure (necessary pressure) in the filling system 1A of the side A is set to, for example, 35 MPa at the stage of reference numeral (1). In FIG. 5, when the supply pressure is set to 35 MPa at the stage of reference numeral (1), the characteristic line indicating the supply pressure and the characteristic line indicating the required pressure overlap, and the solid characteristic line indicating the required pressure only is displayed. In addition, when communication filling is not established in FIG. 5, the required pressure in the side A filling system 1A is set at the stage of reference numeral (1) according to the control described above with reference to FIG. 2.

At a stage indicated by the symbol (2), the pressure of the tank on the vehicle side is transmitted to the filling apparatus 100-1 side by communication filling, so that the required pressure (necessary pressure) which was 35 MPa at the stage of the symbol (1) and the supply pressure on the primary side are corrected to the pressure corresponding to the pressure difference from the pressure of the tank on the vehicle side. The modified pressure is much lower than the maximum value of 80 MPa. After that, when hydrogen gas is filled, the supply pressure gradually increases according to the required pressure (necessary pressure) as indicated by the reference numeral (3), and the discharge pressure of the side A also gradually increases correspondingly to fill the hydrogen gas. At this time, filling is controlled such that the discharge pressure becomes between the allowable upper limit value of pressure and the allowable lower limit value of pressure. The pressure value (opening of the flow rate adjusting valve 2A) fluctuates at a stage of the reference numeral (4), but this is a behavior related to leakage check control and is irrelevant to the illustrated embodiment, and thus the description thereof will be omitted. When the side A is filled, the flow rate adjusting valve 2A of the filling system 1A is controlled to open and close, and the pressure is gradually increased. Display of index related to the opening of the flow rate adjusting valve is omitted.

A hydrogen filling request signal is transmitted on the side B side for filling on the side B, and at a stage of the reference numeral (5), the required pressure on the side B rises substantially vertically, and the required pressure is boosted to 80 MPa. At the stage of the reference numeral (5), the discharge pressure of the side A is high, and in the second embodiment shown, the supply system on the primary side is single. Therefore, the required pressure at the stage of the reference numeral (5) is increased to the maximum value of 80 MPa. Here, when the supply pressure of the side A rises to 80 MPa, the discharge pressure of the filling system 1A also rises, and there is a possibility that the pressure allowable upper limit value may be exceeded. Therefore, as indicated by the symbol ((3), the opening degree of the flow rate adjusting valve 2A on the side A is narrowed down to reduce the pressure (discharge pressure) of the filling system 1A. Even if the supply pressure suddenly rises to 80 MPa at the stage of the reference numeral (5), the discharge pressure of the side A does not exceed the upper limit of the allowable pressure. In order to execute such control, it is necessary to exchange information between the side A control unit 10A (FIG. 4) and the side B control unit 10B (FIG. 4), and to exchange signals or information via the mediation control unit 10C (FIG. 4).

Here, for the reason described below with reference to FIG. 6, the control of narrowing the opening degree of the flow rate adjusting valve 2A on the side A takes longer than the control of boosting the supply pressure to 80 MPa by the hydrogen filling request on the side B side by a time t. This is because if the filling request in the filling system 1B of the side B and the control signal of the flow rate adjusting valve 2A (pressure adjusting valve) of the filling system 1A of the side A are simultaneously transmitted, inconvenience occurs. Such inconvenience will be described with reference to FIG. 6. FIG. 6, which is a characteristic diagram similar to that of FIG. 5, which shows from the start of filling of side A in FIG. 5 to the stage indicated by the reference numeral (5). FIG. 6 shows characteristics when the filling request signal on side B and the control signal of the flow rate adjusting valve 2A (pressure adjusting valve) of the filling system 1A of the side A are simultaneously transmitted. The step indicated by the reference numeral (5) in FIG. 5 is indicated by the reference numeral "5-1" in FIG. 6. In FIG. 6, when the filling request on the side B and the control signal of the flow rate adjusting valve 2A on the side A (control signal for reducing the opening degree to reduce the pressure of the hydrogen gas) are simultaneously transmitted, in a region shown with the reference numeral 5-1, the supply pressure (primary side pressure) increases as indicated by the symbol ($\alpha$), and the discharge pressure of the filling system 1A (discharge pressure of side A) increases as indicated by the symbol $\gamma$. Here, a time from transmitting of the filling request signal on the side B to rising of the discharge pressure of the side A is shorter than a time from transmitting of the control signal of the flow rate adjusting valve 2A on the side A to reducing of opening degree of the flow rate adjusting valve 2A and reducing of pressure of the hydrogen gas. Therefore, in the region 5-1 in FIG. 6, the discharge pressure of the filling system 1A indicated by the symbol $\gamma$ exceeds the upper limit of the allowable pressure due to the increase in the supply pressure indicated by the symbol ($\alpha$). When the discharge pressure (symbol $\gamma$) exceeds the upper limit of the allowable pressure, the side A control unit 10A determines that an "error has occurred", forcibly closes the flow rate adjusting valve 2A of the filling system 1A, and hydrogen filling in the side A with the filling system 1A is forcibly terminated.

In order to prevent the discharge pressure (symbol $\gamma$) from exceeding the upper limit of the allowable pressure in the region indicated by the reference numeral 5-1 in FIG. 6, in the illustrated embodiment, as shown in FIG. 5, when there is a filling request from the side B while filling being performed on the side A, a timing that the filling request is transmitted to the control unit of the rear facility (primary side supply system) via the mediation control unit 10C is delayed by a predetermined time t (for example, three seconds) from a timing that the control unit 10A transmits a control signal for reducing the opening degree of the regulating valve 2A. The delay control is executed in the region indicated by reference numeral (6) in FIG. 5. That is, a timing of information transmission of the filling request on the side B is delayed by a predetermined time t (for example, three seconds) from a timing of the control signal of the flow rate adjusting valve 2A, and after the opening degree of the flow rate adjusting valve 2A decreases, after a delay of a predetermined time t, the required pressure of the side B rises based on the filling request of the side B, and as a result, the supply pressure increases to 80 MPa. Here, since the opening degree of the flow rate adjusting valve 2A on the side A has already decreased, the opening degree of the flow rate adjusting valve 2A is small even if the supply pressure increases to 80 MPa, and the hydrogen gas pressure has already been reduced. Therefore, in the regions indicated by reference numerals (5) and (6) in FIG. 5, the discharge pressure of the filling system 1A does not exceed the upper limit of the allowable pressure.

Here, even if the opening degree of the flow rate adjusting valve 2A decreases, the discharge pressure of the filling system 1A is reduced, and the supply pressure indicated by the symbol ($\alpha$) increases, the predetermined time t is a necessary and sufficient time to prevent the increase in the discharge pressure of the filling system 1A, and is set to, for example, "three seconds". In other words, the predetermined time t (for example, three seconds) is necessary to prevent the discharge pressure of the filling system 1A from exceeding the upper limit of the allowable pressure as shown in the region (5-1) of FIG. 6. In a simulation by the inventor and an experiment using an actual apparatus, a time from the transmission of the control signal to the flow rate adjusting valve 2A to the narrowing of the opening degree of the flow rate adjusting valve 2A is 1 to 2 seconds, and the time to the flow rate adjusting valve 2A is 1 to 2 seconds. Within three seconds from the transmission of the control signal, the opening of the flow rate adjusting valve 2A surely decreases at the stage before the discharge pressure of the side A rises due to the rise of the primary side supply pressure (a), and the pressure of the hydrogen gas can be reduced. Although not shown in FIG. 5, even if the timing (a) at which the hydrogen filling request signal is transmitted on the side B side is earlier than that shown in FIG. 5 (a region near the left end portion in FIG. 5). For example, the required pressure of the side B is set to a value lower than 80 MPa according to the control described above with reference to FIG. 2. In such a case, since the discharge pressure of the side A is low, there is no need to control for delaying the timing of information transmission of the filling request on the side B by a predetermined time t (for example, three seconds) from the timing of the control signal of the flow rate adjusting valve 2A on the side A.

At a stage indicated by reference numeral (7) in FIG. 5, the opening degree of the flow rate adjusting valve 2A has already decreased, but the discharge pressure of the filling system 1A has not decreased so much. In the case illustrated in FIG. 5, at the timing of the supply pressure rise indicated by the symbol ($\alpha$), a pressure in the vehicle-side tank (not shown) to be filled is already boosted to a certain extent, so that the discharge pressure of the filling system 1A, that is, the pressure near the filling nozzle H70 of the discharge system 1A-1, is not lowered below the pressure in the tank on the vehicle side. If the timing (a) of the supply pressure rise is earlier than that shown in FIG. 5 (a region on the left side in FIG. 5), the pressure on the vehicle-side tank side is low and the supply pressure is also low. It is estimated that when the opening degree of the flow rate adjusting valve 2A is narrowed, the discharge pressure is also reduced.

At the stage indicated by the reference numeral (8) in FIG. 5, the filling of the side A is completed. When the filling of the filling system 1A of the side A is completed, the primary side supply pressure becomes a differential pressure (required pressure) required to fill the filling system 1B of the side B. Therefore, before the step (8), the required pressure (necessary pressure) of the side A is higher than the required pressure of the side B, and the supply pressure is 80 MPa or more, whereas at a time that the reference numeral (8) indicates, as indicated by the symbol (6), the supply pressure is stepped down corresponding to the required pressure of the filling system 1B on the side B. Then, the discharge pressure of the side A at which filling is completed is stepped down to zero. Since the supply pressure is set based on the required pressure of the side B after the step (8), it is not necessary to reduce the opening degree of the flow rate adjusting valve 2B of the side B as much as before the step (8). Here, after the step (8), if the opening degree of the flow rate adjusting valve 2B is maintained as small as that before the step (8) (when the so-called "throttled" state is maintained), there is a risk that the discharge pressure of the filling system 1B will fall below the permissible lower limit value.

In order to prevent the discharge pressure of the filling system 1B from falling below the allowable lower limit value, when hydrogen filling of the side A is completed, the control unit 10A sends a control signal indicating that the hydrogen filling of the side A is completed. The control unit 10C transmits a control signal indicating that the hydrogen filling of the side A is completed, and the mediation control unit 10C transmits a control signal indicating that the hydrogen filling of the side A is completed to the control unit 10B of the side B. Upon receiving the control signal, the control unit 10B sends a control signal for increasing opening degree to the flow rate adjusting valve 2B to increase the pressure of the hydrogen gas flowing through the filling system 1B so that the discharge pressure of the filling system 1B does not fall below the allowable lower limit value. As a result of such control, as shown by the reference numeral (9) in FIG. 5, after the filling of the side A is completed (after the reference numeral (8)), the opening degree of the flow rate adjusting valve 2B of the side B increases rapidly in comparison to the step (9). Therefore, it is prevented that the discharge pressure of the side B falls below the permissible lower limit value after the step (8). At a stage indicated by reference numeral (10) in FIG. 5, the supply pressure increases with the passage of time according to the pressure required for filling the filling system 1B, and the discharge pressure of the side B also increases. In the hydrogen gas filling shown in FIG. 5, the discharge pressure is controlled so as to be in a range between the upper limit value of the allowable pressure and the lower limit value of the allowable pressure.

Next, filling control procedure in the second embodiment shown in FIGS. 3 to 6 will be described mainly with reference to FIG. 7. In the description of the filling control performed with reference to FIG. 7, a case where the side A is being filled and the side B is about to start filling will be described as an example. Of course, even in the opposite case (when side B is filling and side A is about to start filling), the control of FIG. 7 can be applied. In FIG. 7, in step S21, the filling apparatus 100-1 determines whether or not filling is performed to a tank of a vehicle. When filling is performed in step S21 (step S21 is "Yes"), the process proceeds to step S22, and when filling is not performed (step S21 is a "No" loop), the process returns to step S21. In step S22, it is determined whether or not the user of the filling apparatus 100-1 inserts the dedicated card (POS card) into the card reader P$\beta$ (FIG. 4) of the operation panel and the card reader P$\beta$ reads the POS card, that is, whether or not the card of the user is a dedicated card for members. If "the POS card is read" in step S22 (step S22 is "Yes"), the process proceeds to step S23, and if the POS card is not read (step S22 is "No"), the process proceeds to step S24.

In step S23, upon reading the POS card, the user is allowed to fill. On the other hand, filling is not permitted in step S24. However, it is also possible to set to allow filling to non-members, and in that case, if the POS card is not read in step S22 (step S22 is "No"), to the rear facility (not shown) is transmitted an information indicating "filling by a non-member", and the process proceeds to step S23. In step S25, the user who is permitted to fill removes the filling nozzles (H70 and H35 in FIG. 4) from the nozzle hooks 7A1, 7A2 and 7B. Here, the nozzle start SW is effective only when the filling is permitted in step S23 and the conditions that the filling nozzles H70 and H35 are removed from the nozzle hooks 7A1, 7A2, and 7B are satisfied. In step S26, a meter (not shown) is reset to zero, and the filling start switch (nozzle switch: SW70, SW35 in FIG. 4) of the nozzles that can be filled blinks. In step S27, the user pushes down the start switch of the nozzle to be used to put it in the "ON" state.

Although not shown in the flowchart of FIG. 7, after step S27, the control of the initial pressure measurement (first embodiment) described with reference to FIG. 2 is executed. By executing the control of the initial pressure measurement, the supply pressure (based on the required pressure) at the initial stage of filling becomes, for example, about 35 MPa (reference numeral (1) in FIG. 5). Then, the process proceeds to step S28. In step S28, when the filling of the side B starts, it is determined whether or not the side A (the other side that is not the side that starts filling) is being filled. This determination is performed based on whether or not a signal indicating that the control unit 10A on the side A is executing the filling control is sent to the control unit 10C for mediation (FIG. 4). If step S28 is "filling the other side (side A)" (step S28 is "Yes"), the process proceeds to step S29, and if "the other side (side A) is not filling" (step S28 is "not filling"). "No") the process proceeds to step S31.

In step S29 of FIG. 7 (when "the other side (side A) is being filled"), a control signal for reducing the opening degree of the flow rate adjusting valve 2A at the side A being filled is transmitted. In the next step S30, three seconds (predetermined time t in FIG. 5) elapses from the transmission of the control signal for reducing the opening degree of the flow rate adjusting valve 2A on the side A in step S29, and then the filling system 1B on the side B (filling request signal) is transmitted. In the control of steps S29 and S30, in step S29, the mediation control unit 10C transmits the filling start information (filling request) of the side B acquired from the control unit 10B to the control unit 10A of the side A, and the control unit 10A of the side A transmits a control signal for reducing the opening degree of the flow rate adjusting valve 2A. Then, three seconds after the control unit 10A transmits a control signal for reducing the opening degree of the flow rate adjusting valve 2A (step S29), the mediation control unit 10C transmits the filling start signal of the side B to a control unit on the fuel gas supply side (step S30). By executing the controls in steps S29 and S30, the opening degree of the flow rate adjusting valve 2A on the side A is narrowed, the discharge pressure on the side A is reduced, and then the supply pressure rapidly increases in response to the filling request on the side B (in the example of FIGS. 5 and 6, the pressure is increased to 80 MPa), so that the situation where the discharge pressure of the filling system 1A exceeds the upper limit of the allowable pressure is prevented (see reference numerals (5) and (6) in FIG. 5).

On the other hand, in step S31 (when "the other side (side A) is not being filled"), after the filling start switch of the side B is turned on, the intermediary control unit 10C immediately sends a filling start signal of the side B to the control unit on the rear facility side. However, as in step S30, it is also possible to transmit the filling start signal three seconds after the filling start switch on the side B is turned on. After transmitting the filling start signal of the side B to the control unit on the rear facility side, the hydrogen gas filling in the side B is started. In step S32, it is determined whether or not filling is started in the filling system 1A on the side A. In step S32, the control unit 10A determines whether or not the filling of the side A is started, and the determination is transmitted to the mediation control unit 10C. In step S32, if "filling is started at side A" (step S32 is "Yes"), the process proceeds to step S33, and if "filling is not started at side A" (step S32 is "No"), the process proceeds to step S35.

In step S33 (when filling is started at side A), the intermediary control unit 10C, to which a control signal to the effect that "filling is started at side A" is transmitted, sends the control signal to the control unit 10B on the side B being filled, and the control unit 10B transmits a control signal for reducing (squeezing) the opening degree of the flow rate adjusting valve 2B (FIG. 4) to reduce the pressure of hydrogen gas flowing through the filling system 1B. Then, the process proceeds to step S34. In step S34, after three seconds (predetermined time t: FIG. 5) have elapsed from the control unit 10B on the side B transmitting the control signal for reducing the opening degree of the flow rate adjusting valve 2B in step S33, the intermediary control unit 10C sends a side A filling request signal to the control unit of the rear facility. Then, the process proceeds to step S36. By executing the controls in steps S33 and S34, since the filling request of side A is transmitted to the control unit of the rear facility when three seconds have passed since the opening of the flow rate adjusting valve 2B on the side B was narrowed and the pressure of the hydrogen gas flowing through the filling system 1B was reduced, when the supply pressure rises (up to 80 MPa in the examples of FIGS. 5 and 6), the pressure of the hydrogen gas flowing through the filling system 1B is decreased, so that the situation where the discharge pressure of the filling system 1B exceeds the allowable upper limit of pressure is prevented.

In step S35 (when filling is not started on the side A), it is determined whether or not the filling of hydrogen gas is completed on the side B being filled. The determination is executed by the control unit 10 B on the side B, and the determination result is transmitted to the mediation control unit 10C. When step S35 is "filling completed" (step S35 is "Yes"), the filling control of the side B is terminated. When "filling is not completed" (step S35 is "No"), the process returns to step S32.

In step S36, which receives the determination results of steps S30 and S34, it is determined whether or not the filling is completed at the side A in a state where the filling is performed in both the side B and the side A filling systems. The determination is executed by the control unit 10A on the side A, and the determination result is transmitted to the intermediary control unit 10C. In step S36, if "filling is completed at side A" (step S36 is "Yes"), the process proceeds to step S37, and if "filling is not completed at side A" (step S36 is "No"), the process proceeds to step S38.

In step S37 when "filling is completed at side A" is in step S36, a control signal for increasing the opening degree of the flow rate adjusting valve 2B is transmitted in order to increase the hydrogen gas pressure in the filling system 1B of the side B being filled. That is, the mediation control unit 10C transmits the information on the completion of filling of the side A acquired from the control unit 10A to the control unit 10B on the side B, and the control unit 10B receiving the information sends the control signal for increasing opening degree of the flow rate adjusting valve 2B. In step S37, when the filling of the side A is completed, the opening degree of the flow rate adjusting valve 2B of the filling system 1B also increases and the pressure of the hydrogen gas increases, so that as shown by the reference numeral (9) in FIG. 5, the situation where the discharge pressure of the system 1B falls below the allowable lower limit value is prevented. When step S37 is completed, the process proceeds to step S35.

Step S38 of FIG. 7 is a case where "filling is not completed at the side A" is in step S36. In step S38, it is determined whether or not the filling at the side B during filling is completed. The determination is executed by the control unit 10B on the side B, and the determination result is transmitted to the mediation control unit 10C. When the determination result in step S38 is "filling is completed" (step S38 is "Yes"), the filling control in the side B is terminated. If "filling is not completed" (step S38 is "No"), the process returns to step S36.

According to the filling apparatus 100-1 of the second embodiment shown in FIGS. 3 to 7, since the supply system on the primary side of a single fuel gas (for example, hydrogen) is branched into the filling system 1A of the side A and the filling system of the side B, and the filling system 1A on the side A is branched into the filling system 1A-1 and the filling system 1A-2, even if a cylinder or a tank for storing hydrogen is not provided inside the filling apparatus, hydrogen gas can be supplied at a required pressure corresponding to the pressure difference with a filling object (for example, a vehicle-side tank). Then, hydrogen gas can be supplied to a plurality of filling objects with a single filling apparatus 100-1. Further, since the mediation control unit 10C that mediates between the side A control unit 10A and the side B control unit 10B is provided, when hydrogen gas is simultaneously filled in the side A filling system 1A and the side B filling system 1B, the discharge pressure during filling can be maintained within a predetermined pressure range (lower than the upper limit and higher than the lower limit), and filling can be performed safely.

Specifically, when filling is started by one filling system (for example, the filling system 1B of the side B) while filling by another filling system (for example, the filling system 1A of the side A), the start of filling may increase the pressure of the fuel gas supplied to the filling apparatus 100-1, and there is a risk that the discharge pressure on the filling system side during filling may exceed the upper limit. On the other hand, in the second embodiment shown in the drawing, the mediation control unit 10C sends a control signal for starting filling at the side B transmitted by the side B to the control unit 10A of the side A under filling, and the control unit 10A of the side A transmits a control signal for reducing opening degree of the flow rate adjusting valve 2A on the side A when receiving the filling start signal on the side B transmitted via the intermediary control unit 10C to reduce the pressure of hydrogen gas flowing through the filling system 1A. Therefore, even if the supply pressure rises sharply, it is possible to prevent the discharge pressure of the side A during filling from exceeding the upper limit.

Here, when a signal to start filling is transmitted to the rear facility side (fuel gas supply side: primary side), the hydrogen gas supply pressure immediately rises. Therefore, a timing at which the signal to start filling is transmitted to the rear facility side and a timing at which the control signal for reducing opening degree of the flow rate adjusting valve 2A on the filling system 1A side of the side A during filling is transmitted are the same, the supply pressure rises and the discharge pressure on the filling system 1A side during filling is increased at a timing earlier than the opening degree of the flow rate adjusting valve 2A is reduced, and the discharge pressure on the filling system 1A side during filling will exceed the upper limit. On the other hand, in the second embodiment shown in the figure, since the mediation control unit 10C has a function of transmitting a filling start signal from the control unit 10B of the side B that starts filling to the rear facility after a predetermined time (for example, three seconds) after the filling side A control unit 10A transmits a control signal for reducing the opening degree of the flow rate adjusting valve 2A, the pressure of hydrogen gas on the filling system 1A side of the filling system 1A is reduced at a timing earlier than the supply pressure and the discharge pressure of the side A during filling increase, it is surely prevented that the discharge pressure of the side A during filling exceeds the upper limit.

Further, when fillings are performed in the filling system 1A of the side A and the filling system 1B of the side B, and the filling is completed in the filling system 1A of the side A, the supply pressure drops sharply, and there is a risk that the discharge pressure of the filling system 1B on the side B, where the filling is in progress, will fall below the lower limit. However, in the second embodiment shown, the mediation control unit 10C transmits a control signal indicating that the filling of the side A is completed to the control unit 10B of the side B that continues filling. Upon receiving the control signal, the control unit 10B of the side B transmits a control signal for increasing opening degree of the flow rate adjusting valve 2B of the filling system 1B to boost the discharge pressure of the filling system 1B of the side B, which prevents that the discharge pressure of the side B that continues to fall below the lower limit.

It is added that illustrated embodiments are merely examples and are not descriptions intended to limit the technical scope of the present invention. For example, the illustrated embodiments refer to the cases where a single hydrogen gas (fuel gas) supply system has one filling apparatus (however, the filling system may be single or multiple). The present invention is also applicable when a plurality of (two or three or more) filling apparatuses are provided in a single hydrogen gas (fuel gas) supply system. In this case, the mediation control unit according to the second embodiment can be provided in each filling apparatus, and a comprehensive mediation control unit that controls the plurality of mediation control units can be provided.

DESCRIPTION OF THE REFERENCE NUMERALS 1A side A filling system
1B side B filling system
2A, 2B flow rate control valves (pressure control valves)
10 control unit
10A side A control unit
10B side B control unit
10C, 10F mediation control units
10G comprehensive mediation control unit
21 vehicle-side tank
100, 100-1 filling apparatuses
200 rear facility (fuel gas supply side)

The invention claimed is:

1. A filling apparatus comprising a control unit, wherein said control unit is configured to:
execute control for boosting pressure required from a rear supply facility in operative communication with the filling apparatus until a discharge pressure of the filling apparatus is equal to a prescribed initial pressure magnitude; and determine whether or not communication filling is established, and:
- when communication filling is established, to set the discharge pressure to be higher than an internal pressure of a tank received from a vehicle side by a predetermined amount; and
- when communication filling is not established, to set the discharge pressure to be equal to 30 to 60% of a maximum value.

2. The filling apparatus claimed in claim 1, wherein said control unit is configured to set the discharge pressure to be higher than a measured internal pressure of a vehicle-side tank by a constant pressure after the prescribed initial pressure magnitude is met.

3. The filling apparatus as claimed in claim 1, wherein said control unit is configured to increase the discharge pressure when flow rate of a gas to be filled is less than a predetermined value.

4. The filling apparatus claimed in claim 1, wherein said control unit is configured to set the discharge pressure to be higher than a measured internal pressure of a vehicle-side tank by a constant pressure after the prescribed initial pressure magnitude is met.

5. The filling apparatus as claimed in claim 1, wherein said control unit is additionally configured to increase the discharge pressure when flow rate of a gas to be filled is less than a predetermined value.

6. The filling apparatus claimed in claim 5, wherein said control unit is configured to set the discharge pressure to be higher than a measured internal pressure of a vehicle-side tank by a constant pressure after the prescribed initial pressure magnitude measurement is met.

7. A filling method comprising the steps of:
- determining whether or not a discharge pressure of a filling apparatus has met an initial prescribed pressure magnitude, and boosting the discharge pressure until the prescribed pressure magnitude is met; and
- determining whether or not communication filling is established, and:
  - setting the discharge pressure to a magnitude higher than an internal pressure of a tank received from a vehicle side by a predetermined magnitude amount when communication filling is established; and
- setting the discharge pressure to be equal to 30 to 60% of a maximum value when communication filling is not established.

8. The filling method as claimed in claim 7, wherein said discharge pressure is increased when flow rate of a gas to be filled is less than a predetermined value.

9. The filling method as claimed in claim 7, wherein said discharge pressure is set higher than a measured internal pressure of a vehicle-side tank by a constant pressure after the discharge pressure meets the initial prescribed pressure magnitude.

10. The filling method as claimed in claim 7, wherein said discharge pressure is increased when flow rate of a gas to be filled is less than a predetermined value.

\* \* \* \* \*